United States Patent [19]

Vincent et al.

[11] 4,012,419
[45] Mar. 15, 1977

[54] BISFLUORAN CHROMOGENIC COMPOUNDS, PREPARATION THEREOF, AND PRESSURE-SENSITIVE COPY SYSTEMS EMPLOYING SAME

[75] Inventors: David N. Vincent, Glenview; Cheng Hsiung Chang, Chicago, both of Ill.

[73] Assignee: Champion International Corporation, Stamford, Conn.

[22] Filed: Jan. 2, 1974

[21] Appl. No.: 430,141

Related U.S. Application Data

[62] Division of Ser. No. 329,294, Feb. 5, 1973, Pat. No. 3,821,010.

[52] U.S. Cl. .................................. 260/335; 428/914
[51] Int. Cl.[2] ........................................ C07D 519/00
[58] Field of Search .................................... 260/335

[56] References Cited

UNITED STATES PATENTS 3,663,571  5/1972  Kimura et al. .................... 260/335

FOREIGN PATENTS OR APPLICATIONS 2,110,859  9/1971  Germany

OTHER PUBLICATIONS

Chemical Abstracts, vol. 77 (1972) 63346c, abstract of Ger. Offen., 2,150,666, Apr. 13, 1972.

*Primary Examiner*—Norma S. Milestone
*Attorney, Agent, or Firm*—Roylance, Abrams, Berdo & Kaul

[57] ABSTRACT

A substantially colorless bisfluoran chromogenic material having the structural formula

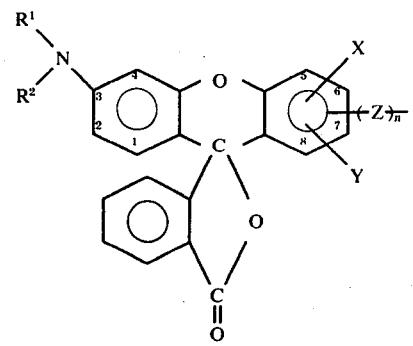

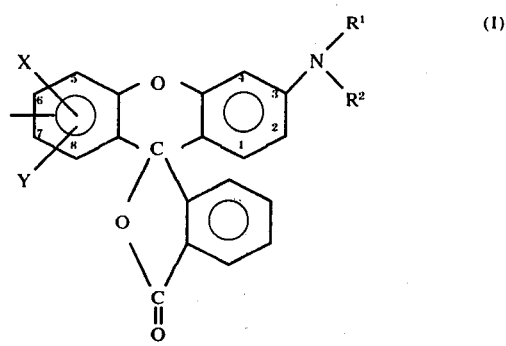

(I)

wherein
 $R^1$ and $R^2$ each represent an alkyl group;
 X and Y each represent a hydrogen atom, a halogen atom, an hydroxyl group, an alkyl group, a nitro group, an amino group, an acyl group, or a carboalkoxy group;
 Z represents an oxy radical, a carbonyl group, an alkylene group, an alkylidene group, a sulfonyl group, or a thio radical; and
 n represents an integer from 0 to 1.

The bisfluoran compounds are produced by reacting a 4-dialkylamino-2-hydroxy-2′-carboxybenzophenone with a diphenol wherein the diphenol is unsubstituted in at least one of the positions ortho to an hydroxyl group in each of the phenyl rings. The bisfluorans are used in pressure-sensitive copy systems comprising a support bearing microcapsules containing the bisfluorans, alone, or in combination with other color-forming materials.

3 Claims, No Drawings

BISFLUORAN CHROMOGENIC COMPOUNDS, PREPARATION THEREOF, AND PRESSURE-SENSITIVE COPY SYSTEMS EMPLOYING SAME

This is a division of application Ser. No. 329,294 filed Feb. 5, 1973, now U.S. Pat. No. 3,821,010 to Vincent and Chang. This invention relates to chromogenic compounds, the production of such compounds and to pressure-sensitive copy systems employing such compounds. More particularly, this invention relates to substantially colorless bisfluoran chromogenic compounds which are converted to a red color when placed in reactive contact with Lewis acid material, such as in a pressure-sensitive copy system.

Numerous making systems have been suggested which involve localized contact between a chromogenic compound and a color-developing substance in areas where a colored marking is desired. Pressure-sensitive mark-forming systems are described, for example, in U.S. Pat. Nos. 3,418,656 and 3,418,250 to A. E. Vassiliades. These patents describe a marking system wherein a substantially colorless chromogenic substance is disposed in minute oil droplets within microcapsules, the walls of which form pressure-rupturable barriers. The microcapsules are coated onto a substrate which is superimposed onto a receiving sheet, which is coated with an electron-accepting material of the Lewis acid type, such as an acid-treated clay. Upon application of localized pressure to the opposite side of the microcapsule-coated sheet, the microcapsules are ruptured and the colorless chromogenic substance is released for reaction with the acidic co-reactant to provide a distinctive mark.

Numerous chromogenic compounds have been proposed for use in such marking systems, and various deficiencies have been encountered. For example, certain chromogenic compounds lack stability upon exposure to light. Likewise, other chromogenic substances do not form images that are readily reproducible by xerographic or other reproductive processes.

Various color formers produce red coloration upon reaction with electron acceptors. Examples are Rhodamine Lactone, Rhodamine Anilinolactam, various lactonized products of Rhodamine B, Rhodamine G, and Rhodamine GCP, and the like. Several of these compounds when left under normal ambient conditions quickly show coloration owing to their instability. Hence, a copy sheet having a coating of microcapsules containing such color formers tends to become red colored even before use. Other chromogenic compounds, which are stable under the conditions of storage, are too slow to form a red coloration upon release from the microcapsules by the application of localized pressure and may require several minutes for the color to develop completely.

In accordance with the present invention, there is provided a substantially colorless, chromogenic compound having the structural formula

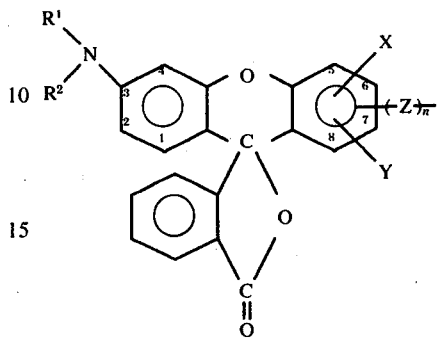

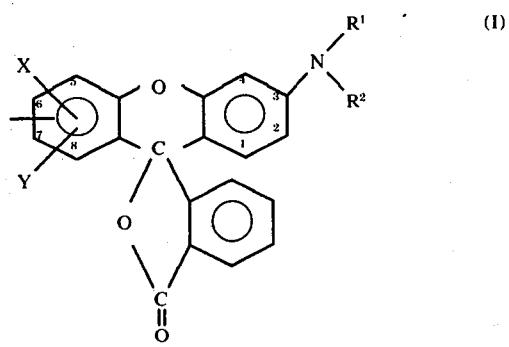

(I)

wherein
R¹ and R² each represent an alkyl group;
X and Y each represent a hydrogen atom, a halogen atom, an hydroxyl group, an alkyl group, a nitro group, an amino group, an acyl group, or a carboalkoxy group;
Z represents an oxy radical, a carbonyl group, an alkylene group, an alkylidene group, a sulfonyl group, or a thio radical; and
n represents an integer from 0 to 1.

The substantially colorless bisfluorans of the present invention are converted to a red coloration upon contact reaction with an acidic color-activating substance, e.g., a Lewis acid material. Significantly, the resultant markings possess excellent stability upon exposure to light. In addition, the bisfluorans may be combined with conventional blue imaging systems, for example, to provide markings which may be efficiently duplicated by xerographic and other copying machines. Still further, a black image may be formed by combining the instant bisfluorans with other chromogenic materials as will be hereinafter demonstrated.

A preferred form of the bisfluorans of the present invention are the 7,7′bisfluorans having the formula

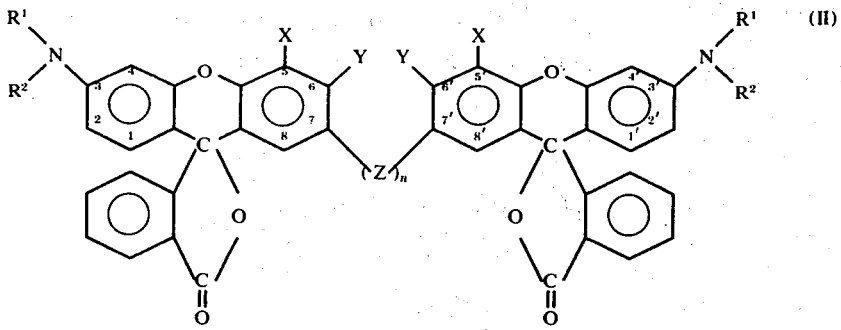

(II)

wherein $R^1$, $R^2$, X, Y, Z and n are defined as previously indicated.

Preferably, the chromogenic compounds have the foregoing formulas (I) and (II) wherein R represents a lower alkyl group, i.e., $C_1$–$C_5$ alkyl group, e.g., methyl, ethyl, propyl, etc.;

X and Y each represent a hydrogen atom, a halogen atom, e.g., chlorine, bromine, etc., an hydroxyl group, a lower alkyl group, i.e., a $C_1$–$C_5$ alkyl group, e.g., methyl, ethyl, propyl, etc., a nitro group, a primary amino group, a $C_2$–$C_5$ acyl group, e.g., acetyl, butyryl, etc., or a lower carboalkoxy group, i.e., carbomethoxy, carboethoxy, carbopentoxy group;

Z represents an oxy radical, a carbonyl group, a lower alkylidene group, i.e., $C_1$–$C_5$ alkylidene, e.g., isopropylidene, sec-butylidene, etc., a lower alkylene group, i.e., $C_1$–$C_5$ alkylene, i.e., $-(CH_2)_p-$ wherein p is an integer from 0 to 5, e.g., methylene, ethylene, butylene, etc., a sulfonyl group, or a thio radical; and n represents an integer from 0 to 1.

Examples of the bisfluoran compounds of the present invention include 7,7′-bis(3-diethylaminofluoran)
7,7′-bis(3-diethylamino-5-methylfluoran)
7,7′-methylene-bis(3-diethylaminofluoran)
7,7′-isopropylidene-bis(3-diethylaminofluoran)
7,7′-sec-butylidene-bis(3-diethylaminofluoran)
7,7′-bis(3-diethylaminofluoranyl) ketone
7,7′-bis(3-diethylaminofluoranyl) ether
7,7′-sulfonyl-bis(3-diethylaminofluoran)
7,7′-sulfonyl-bis(5-amino-3-diethylaminofluoran)
7,7′-thio-bis(3-diethylaminofluoran)
7,7′-isopropylidene-bis(3-dimethylaminofluoran)
5,5′-bis(3-diethylaminofluoran)
5,5′-bis(3-diethylamino-7-methylfluoran)
7,5′-sulfonyl-bis(3-diethylaminofluoran)
7,5′-thio-bis(3-diethylaminofluoran)
7,7′-bis(6-acetyl-3-diethylaminofluoran)
7,7-bis(6-carbomethoxy-3-diethylaminofluoran)
7,7′-sulfonyl-bis(6-nitro-3-diethylaminofluoran) and the like.

According to the present invention, the bisfluorans are produced by reacting a 4-dialkylamino-2-hydroxy-2′-car-boxybenzophenone with a diphenol, wherein the diphenol is unsubstituted in at least one of the positions ortho to an hydroxyl group in each of the phenol rings. The bisfluorans of the present invention are produced by reacting a carboxybenzophenone having the formula

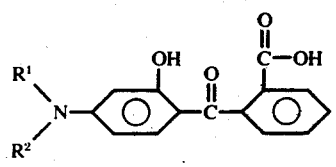

wherein $R^1$ and $R^2$ are defined as previously indicated, and a diphenol having the formula

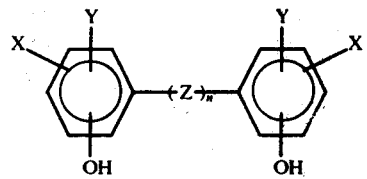

wherein X, Y, Z and n are defined as previously indicated. The diphenol is unsubstituted in at least one of the positions ortho to an hydroxy group in each of the phenyl rings.

Suitable carboxybenzophenones include, for example, 4-dimethylamino-2-hydroxy-2′-carboxybenzophenone, 4-diethylamino-2-hydroxy-2′-carboxybenzophenone, and the like.

Likewise, suitable diphenols include, for example,
4,4′-biphenol
2,2′-dimethyl-4,4′-biphenol
4,4′-methylenediphenol
4,4′-isopropylidenediphenol
4,4′-sec-butylidenediphenol
4,4′-dihydroxybenzophenone
4,4′-dihydroxydiphenyl ether
4,4′-sulfonyldiphenol
2,2′-diamino-4,4′-sulfonyldiphenol
4,4′-thiodiphenol
2,2′-biphenol
4,4′-diisopropyl-2,2′-biphenol
2,4′methylenediphenol
2,4′-biphenol
2,4′-methylenediphenol
2,2′-methylene-m-cresol
2,4′-sulfonyldiphenol
2,4′-thiodiphenol, and the like.

The substituted diphenol and the 4-dialkylamino-2-hydroxy-2′-carboxybenzophenone are reacted under acidic conditions, e.g., in the presence of sulfuric or phosphoric acid, at a temperature, for example, in the range of between about 60° and about 120° C., preferably between 80° and about 100° C., while, preferably, under stmospheric pressure conditions, for a period of, for example, between 1 and 75 hours, preferably between about 1 and about 4 hours. Subsequently, the reaction mixture is cooled, neutralized, extracted with organic solvent, and the solvent is removed to provide a substantially colorless crystalline product, which becomes reddish in color upon contact with a Lewis acid. The resulting bisfluorans absorb light within the wave length of 460 to 560 millimicrons in a 95 percent acetic acid solution.

According to a further aspect of the present invention, the bisfluorans can be dissolved in an oily solvent, such as chorinated biphenyls, cottonseed oil, coconut oil or the like, and encapsulated for use in a copy system. Any suitable process may be utilized for forming the microcapsules and the copy sheets bearing such microcapsules including those processes described in U.S. Pat. Nos. 3,418,250 and 3,418,656, the disclosures of which are hereby incorporated by reference. The resultant microcapsules may be coated on or incorporated in a web or substrate, such as paper, and utilized in any form of pressure-sensitive copy system wherein the microcapsules are ruptured under localized pressure to release the bisfluoran for contact with an acidic co-reactant. Thus, for example, the microcapsule-bearing substrate may be also coated with the acidic, co-reactant, such as an acidic clay. Such system is normally referred to as a "self-contained" or "autogenous" system, since the colorless chromogenic material and the acidic, co-reactant are present on the same substrate. Alternatively, the microcapsules containing the bisfluorans of the present invention may be coated onto and/or incorporated into a substrate which is used in combination with a separate sheet or substrate which contains the acidic co-reactant. This type of copy system is normally referred to as a "transfer copy system," and upon rupture of the capsules by localized pressure the bisfluoran chromogen contacts a separate acid-coated sheet upon which a colored mark is thereby provided. Accordingly, the colorless bisfluorans of the present invention may be utilized in any copy system where they are isolated from the acidic co-reactant prior to the formation of the desired colored image. Any of the well-known acidic materials including bentonite, kaolin, acidic clays, talc, aluminum silicate, calcium citrate, metal oxides, metal chlorides, or the like may be utilized as the acidic co-reactant for the present bisfluorans.

As previously mentioned, the bisfluorans of the present invention provide a reddish color upon contact with the acidic co-reactant. Alternatively, the bisfluorans may be used in combination with other colorless chromogenic compounds, such as Crystal Violet Lactone and Benzoyl Leuco Methylene Blue in order to improve, for example, normally blue imaging systems and enable such systems to provide colored marks which may be efficiently duplicated by xerographic copying machines. Similarly, the bisfluorans of the present invention may be combined with other colorless chromogenic compounds, as will be hereinafter illustrated to provide black images having improved reproduction qualities.

Various concentrations of the present bisfluorans may be utilized in the formation of bisfluoran-containing microcapsules for use in copy systems. Thus, for example, the bisfluorans can be used in amount of between about 0.2 part and about 2 parts by weight per 100 parts by weight of the oily core material of the microcapsules. Preferably, between about 1.0 and about 1.5 parts by weight per 100 parts by weight of oil may be employed. Larger amounts of the bisfluorans may be utilized, if desired. However, relatively small amounts of the bisfluorans develop a high intensity color which is not increased by using greater concentrations. Suitable amounts of the bisfluoran for each system may be easily determined experimentally.

As previously mentioned, the bisfluorans may be combined with blue imaging chromogenic substances, such as Crystal Violet Lactone and Benzoyl Leuco Methylene Blue thereby providing a marking system having improved reproducibility by normally blue-insensitive copying methods, e.g., the xerographic methods now in use. The addition of the present bisfluorans does not materially modify the visible blue color of the resultant marking. However, if desired, additional amounts of the bisfluorans may be added to the conventional blue systems to provide a purplish hue. When combining the bisfluorans with the blue imaging materials, it is preferred to use, for example, between about 0.2 and about 0.8 parts by weight of the bisfluorans and about 1.5 and about 4.0 parts by weight of the blue image-yielding chromogenic materials, all based upon 100 parts by weight of the oily core material. The invention will be further illustrated by the following examples. The percentages are by weight unless otherwise specified.

EXAMPLE 1

Preparation of 7,7'-bis(3-diethylaminofluoran)

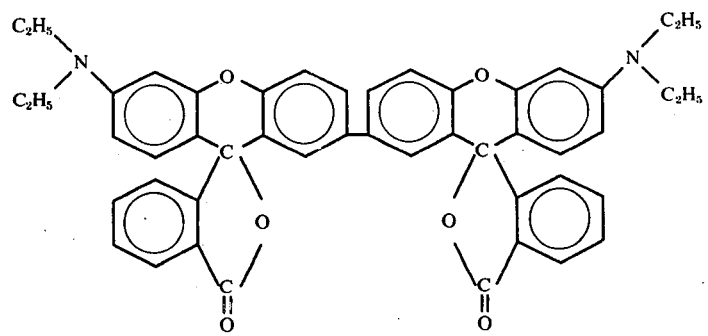

In 200 grams of 70 percent sulfuric acid are dissolved 0.1 mole of 4-diethylamino-2-hydroxy-2'-carboxybenzophenone and 0.05 mole of 4,4'-biphenol. The preparation of the carboxybenzophenone is disclosed in Beilstein, "Handbuch der Organischen Chemie,"vol. 14, page 675; ibid, vol. 14, Supplement 1, page 710. The resulting solution is heated at 90° to 95° C. for 3 hours.

After cooling to room temperature, the solution is poured into an excess of ice, forming a precipitate. The mixture is neutralized with ammonium hydroxide and extracted with toluene. Next, the organic solution is washed with a 10 percent sodium hydroxide solution and then with water until the washings are neutral. Upon the removal of solvent under a reduced pressure, crude crystals are obtained. Recrystallization from benzene gives 11.1 grams of the white solid 7,7'-bis(3-diethylaminofluoran), having a melting point of 285°–287° C.

The purified product has absorption maxima at 540 mμ, 506 mμ, and 470 mμ in a 95 percent acetic acid solution and yields a colorless solution in an organic solvent which forms a rose-red color when contacted with an acidic clay.

EXAMPLE 2

Preparation of 7,7'-bis(3-diethylamino-5-methylfluoran)

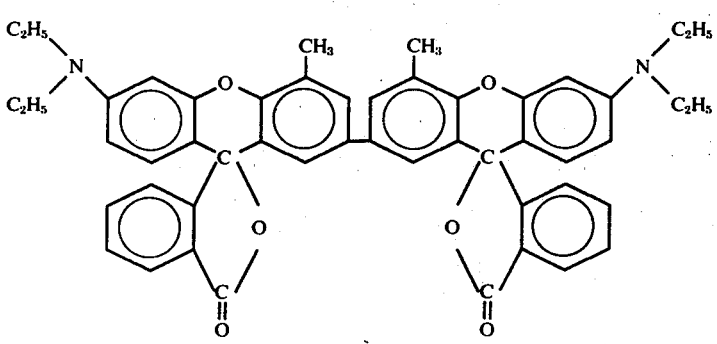

The procedure of Example 1 is repeated using 3,3'-dimethyl-4,4'-biphenol instead of 4,4'-bisphenol. Twelve and one half grams of colorless, crystalline 7,7'-bis(3-diethylamino-5-methylfluoran) is obtained. The compound melts at 218°–220° C.

The purified product has absorption maxima of 545 mμ, 512 mμ, and 470 mμ in acetic acid solution. A colorless solution of this product is an organic solvent develops a rose-red color on acidic clay.

EXAMPLE 3

Preparation of 7,7'-methylene-bis(3-diethylaminofluoran)

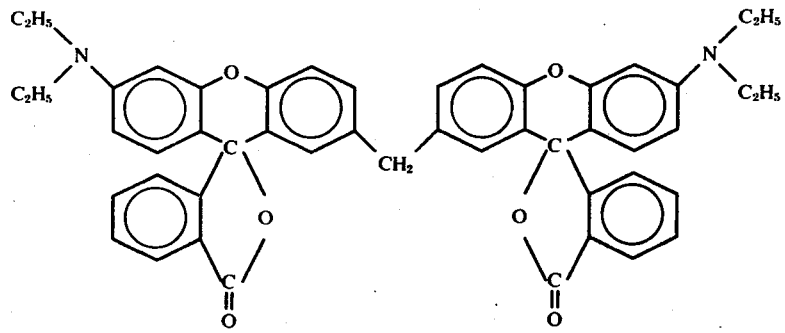

Once again, the procedure of Example 1 is repeated except that 4,4'-methylenediphenol is used instead of 4,4'-biphenol. The product 7,7'-methylene-bis(3-diethylaminofluoran) is obtained in an amount of 18.4 grams and has a melting point of 185°–187° C.

The product has absorption maxima at 532 mμ, 498 mμ, and 463 mμ in acetic acid. A colorless solution of this product in an organic solvent imparts an orange-red color on acidic clay.

EXAMPLE 4

Preparation of 7,7'-isopropylidene-bis(3-diethylaminofluoran)

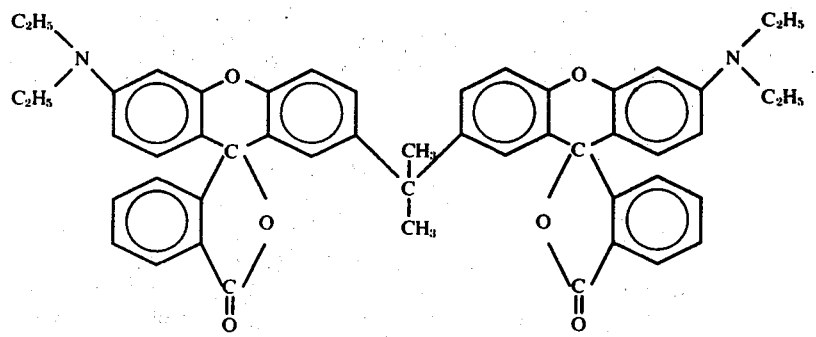

A solution of 0.1 mole of 4-diethylamino-2-hydroxy-2'-carboxybenzophenone and 0.05 mole of 4,4'-isopropylidene-diphenol in 200 grams of 70 percent sulfuric acid is heated at 78°–80° C. for 4 hours. The red solution is cooled and poured into about 1,000 grams of ice water to form a precipitate. To the mixture is added a solution of 5 percent sodium hydroxide to adjust the pH to about 10. The solid is collected by filtration and then washed with ether. Recrystallization from benzene yields 23.5 grams of 7,7'-isopropylidene-bis(3-diethylaminofluoran), having a melting point of 180°–182° C.

The product has absorption maxima at 535 mµ, 498 mµ, and 464 mµ in acetic acid. A solution of this compound in an organic solvent is colorless and displays an orange-red color on acidic clay.

EXAMPLE 5

Preparation of 7,7'-sec-butylidene-bis(3-diethylaminofluoran)

The product has absorption maxima at 526 mµ, 497 mµ, and 462 mµ in acetic acid. A solution of this product in an organic solvent is colorless and shows an orange-red color on acidic clay.

EXAMPLE 6

Preparation of 7,7'-bis(3-diethylaminofluoranyl) ketone

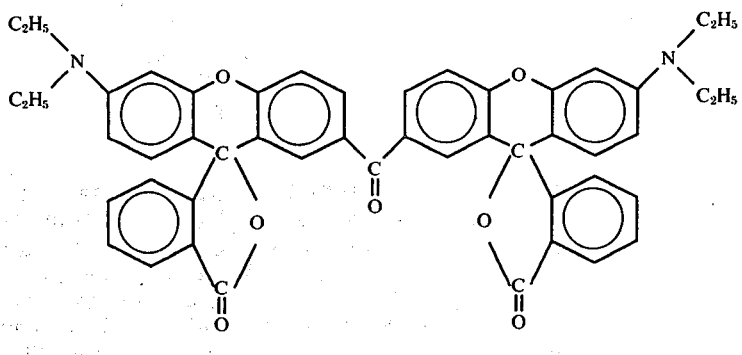

Fifteen grams of 4-diethylamino-2-hydroxy-2'-carboxybenzophenone and 5 grams of 4,4'-dihydroxybenzophenone are dissolved in 100 grams of 70 percent sulfuric acid. The resulting solution is stirred at 90° C. for 3 days. The work-up procedure described in Example 1 is used to obtain a lightly brown solid. Recrystallization from toluene-petroleum ether yields 9.5 grams of substantially colorless crystals of 7,7'-bis(3-diethylaminofluoranyl) ketone, having a melting point of 170°–172° C.

The product has absorption maxima at 523 mµ, 494 mµ, and 463 mµ in acetic acid. A solution of the puri-

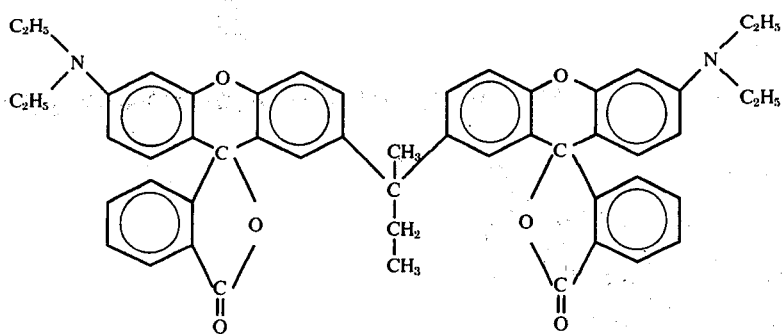

The procedure of Example 4 is repeated with the exception of using 4,4'-sec-butylidenediphenol in place of 4,4'-isopropylidenediphenol. A 24.6 gram yield of 7,7'-sec-butylidene-bis(3-diethylaminofluoran) is isolated, having a melting point of 209°–210° C.

fied material in an organic solvent is colorless and produces a red color on acidic clay.

EXAMPLE 7

Preparation of 7,7'-bis(3-diethylaminofluoranyl) ether

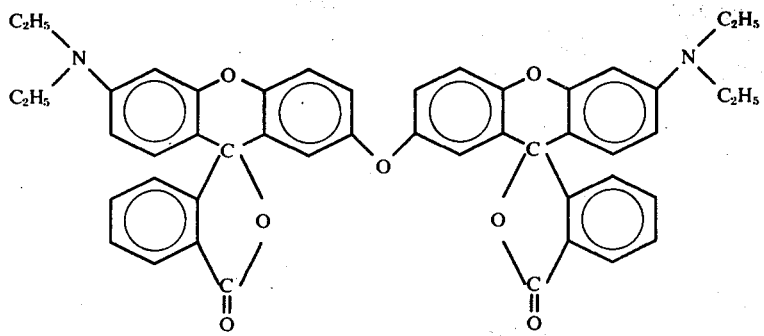

One gram of 4,4'-dihydroxydiphenyl ether is added to a solution of 3.2 grams of 4-diethylamino-2-hydroxy-2'-carboxybenzophenone in 50 grams of 70 percent sulfuric acid. The solution is heated at 98° C. for 4 hours. The same work-up procedure set forth in Example 1 is employed to obtain 2.2 grams of almost colorless crystalline product. The crystals of 7,7'-bis(3-diethylaminofluoranyl) ether melt at 212°–213° C.

The product has absorption maxima at 509 m$\mu$, 492 m$\mu$, and 472 m$\mu$ in acetic acid. A colorless solution of this color former in an organic solvent generates a red color on acidic clay.

EXAMPLE 8

Preparation of 7,7'-sulfonyl-bis(3-diethylaminofluoran)

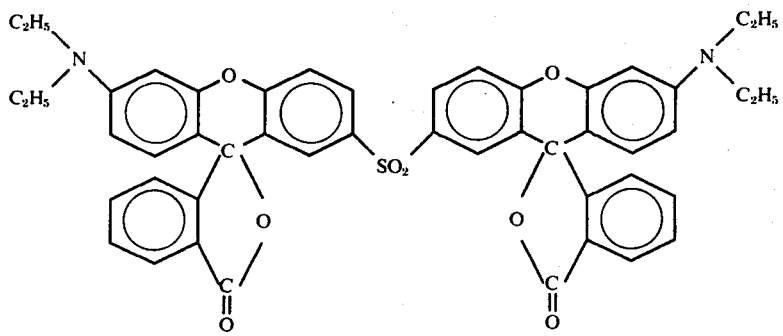

Both 6.3 grams of diethylamino-2-hydroxy-2'-carboxybenzophenone and 2.5 grams of 4,4'-sulfonyldiphenol are dissolved in 100 grams of 70 percent sulfuric acid. The solution is stirred at 90°–95° C. for 3 days. A purple solution is formed. The solution is cooled and poured into ice water. The mixture is neutralized with concentrated ammonium hydroxide and extracted with chloroform. The chloroform extract is washed with a 2 percent sodium hydroxide solution and followed by three washings with water. A pinkish solid is obtained upon the removal of toluene. It is recrystallized from benzene to provide 3.6 grams of 7,7'-sulfonyl-bis(3-diethylaminofluoran) having a melting point of 194°–196° C.

The product has absorption maxima at 522 m$\mu$, 494 m$\mu$, and 464 m$\mu$ in acetic acid. A solution of this chromogenous compound in an organic solvent is colorless and exhibited a purple color on acidic clay.

EXAMPLE 9

Preparation of 7,7'-sulfonyl-bis(5-amino-3-diethylaminofluoran)

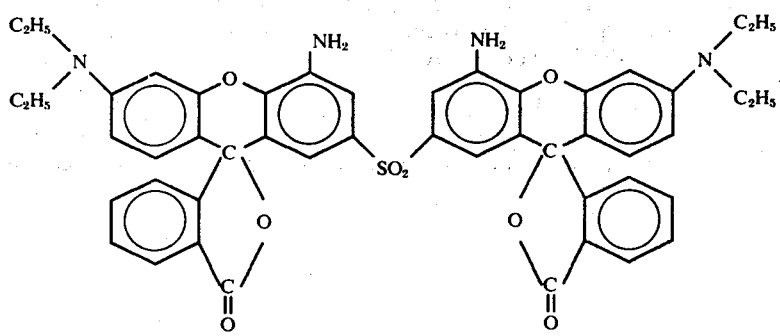

The synthesis of 7,7'-sulfonyl-bis(5-amino-3-diethylaminofluoran) is conducted using the procedure of Example 8 with the exception that 2.8 grams of 2,2'-diamino-4,4'sulfonyldiphenol) are substituted for 4,4'- sulfonyldiphenol. Recrystallization from ethyl acetate yields 2.8 grams, having a melting point of 200°–203° C.

The product has absorption maxima at 556 mμ and 517 mμ in acetic acid. A colorless solution of this compound in an organic solvent showed a purple color on acidic clay.

EXAMPLE 10

Preparation of 7,7'-thio-bis(3-diethylaminofluoran)

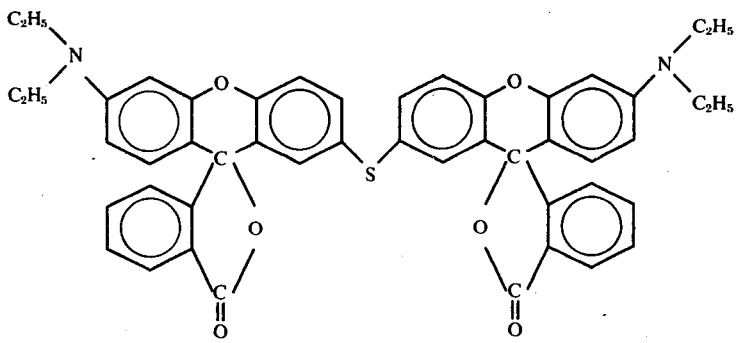

In 200 grams of 70 percent sulfuric acid are dissolved 12.6 grams of 4-diethylamino-2-hydroxy-2'-carboxybenzophenone and 4.4 grams of 4,4'-thiodiphenol. The solution is heated at 93° C. for 1 hour. The procedure of Example 1 is followed to produce the desired color former, 7,7'-thio-bis(3-diethylaminofluoran). The yield is 6.1 grams, having a melting point of 150°–154° C.

The product has an absorption maximum at 522 mμ in acetic acid. A colorless solution of the product in an organic solvent developed a red color on acidic clay.

EXAMPLE 11

Following the encapsulation procedure of U.S. Pat. No. 3,418,656, one part of the bisfluoran color former of Example 1 is dissolved in a mixture of 51 parts of coconut oil and 34 parts of a partially hydrogenated (40%) terphenyl (specific gravity 1.005, flash point 345° F. and pour point −28° C.). This solution is then emulsified in 500 parts of a 6 percent aqueous solution of methyl cellulose. Agitation is continued while 20 parts of a 65 percent aqueous solution of urea-formaldehyde resin are added to the emulsion. The system is then heated for 4 hours at 60° C. to complete the encapsulation. The microcapsules are then coated onto a sheet of paper. The paper is superimposed over an acidic clay-coated paper and localized pressure is applied. A red image immediately develops on the clay-coated paper.

EXAMPLE 12

The procedure of Example 11 is repeated, except that instead of the bisfluoran color former of Example 1, a mixture of 1.4 parts of Crystal Violet Lactone, 1.2 parts of Benzoyl Leuco Methylene Blue, and 0.3 part of the bisfluoran color former of Example 4 is used. Blue Color marks are obtained on a clay-coated paper, which marks are capable of being reproduced satisfactorily by xerographic copying machines.

EXAMPLE 13

The same procedure as in Example 11 is repeated while using, instead of color former of Example 1, above, a mixture of 0.02 part of color former of Example 1, 0.8 part of color former of Example 4, 1.3 parts of Crystal Violet Lactone, 0.6 part of Benzoyl Leuco Methylene Blue, and 1.2 parts of an isomeric mixture of cis 3,5- and trans 3,7-bis(3',6'-dimethoxy-9'-spiroxanthyl)pyromellitide (a yellow color former). The preparation of the pyromellitides is described in copending U.S. patent application Ser. No. 329,293, filed Feb. 5, 1973, now U.S. Pat. No. 3,819,010 to Vincent et al. entitled "Dilactone Chromogenic Compounds, Preparation Thereof, and Pressure-Sensitive Copy Systems Employing Same."

A black image is instantly formed on an acidic clay-coated sheet upon rupture of the chromogenic compound-containing microcapsules. The resultant black image is reproducible by xerographic copying machines.

This invention has been described in considerable detail with particular reference to preferred embodiments, but it will be understood that variations and modifications can be effected within the spirit and scope of the invention as described in the appended claims.

What is claimed is:
1. 7,7'-bis(3-diethylaminofluoran).
2. 7,7'-bis(3-diethylamino-5-methylfluoran).
3. A chromogenic compound represented by the formula

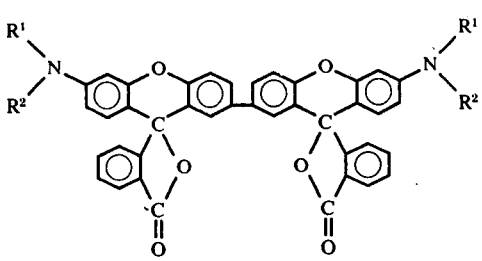

wherein $R^1$ and $R^2$ each represent an alkyl group.

* * * * *